United States Patent
Ward et al.

(10) Patent No.: US 8,427,483 B1
(45) Date of Patent: Apr. 23, 2013

(54) DRAWING FIGURES IN COMPUTER-BASED DRAWING APPLICATIONS

(75) Inventors: Jeffrey C. Ward, Arvada, CO (US);
Jonathan Ballagh, Boulder, CO (US);
Tyson Stecklein, Thornton, CO (US);
Roger B. Milne, Boulder, CO (US)

(73) Assignee: Disney Enterprises. Inc., Burbank, CA (US)

( * ) Notice: Subject to any disclaimer, the term of this patent is extended or adjusted under 35 U.S.C. 154(b) by 295 days.

(21) Appl. No.: 12/871,759

(22) Filed: Aug. 30, 2010

(51) Int. Cl.
*G06T 13/00* (2011.01)

(52) U.S. Cl.
USPC ............................ 345/473; 345/649; 345/672

(58) Field of Classification Search ................. None
See application file for complete search history.

(56) References Cited

U.S. PATENT DOCUMENTS

| | | | | |
|---|---|---|---|---|
| 5,500,937 A * | 3/1996 | Thompson-Rohrlich | ..... | 715/764 |
| 5,566,292 A * | 10/1996 | Krembs | ......... | 345/442 |
| 5,581,276 A | 12/1996 | Cipolla et al. | | |
| 5,588,098 A * | 12/1996 | Chen et al. | ..... | 345/653 |
| 5,602,570 A * | 2/1997 | Capps et al. | ..... | 345/173 |
| 5,704,028 A | 12/1997 | Schanel et al. | | |
| 5,825,423 A | 10/1998 | Jung | | |
| 5,892,854 A * | 4/1999 | de Queiroz et al. | ........ | 382/288 |
| 5,974,169 A * | 10/1999 | Bachelder | ..... | 382/151 |
| 6,016,487 A | 1/2000 | Rioux et al. | | |
| 6,120,445 A | 9/2000 | Grunwald | | |
| 6,304,272 B1 * | 10/2001 | Schanel et al. | ........ | 345/676 |
| 6,408,092 B1 * | 6/2002 | Sites | ..... | 382/187 |
| 6,611,264 B1 * | 8/2003 | Regan | ..... | 345/422 |
| 6,664,957 B1 | 12/2003 | Sato et al. | | |
| 7,427,995 B2 * | 9/2008 | Farrah | ..... | 345/619 |
| 7,737,967 B2 * | 6/2010 | Chernichenko et al. | ..... | 345/419 |
| 8,218,900 B1 * | 7/2012 | Avidan et al. | ..... | 382/284 |
| 2001/0015728 A1 * | 8/2001 | Fujiwara et al. | ..... | 345/588 |
| 2003/0038811 A1 | 2/2003 | Gritz et al. | | |
| 2003/0198385 A1 | 10/2003 | Tanner et al. | | |
| 2004/0076342 A1 * | 4/2004 | Wolff et al. | ..... | 382/294 |
| 2004/0091176 A1 | 5/2004 | Bai | | |
| 2005/0013486 A1 | 1/2005 | Wiedemann et al. | | |
| 2005/0063590 A1 | 3/2005 | Simon et al. | | |
| 2006/0055700 A1 * | 3/2006 | Niles et al. | ..... | 345/473 |
| 2006/0078224 A1 | 4/2006 | Hirosawa | | |
| 2006/0262105 A1 | 11/2006 | Smith et al. | | |
| 2007/0092110 A1 | 4/2007 | Xu et al. | | |
| 2007/0098264 A1 | 5/2007 | Van Lier et al. | | |

(Continued)

OTHER PUBLICATIONS

Amato, Nancy M. et al., Choosing Good Distance Metrics and Local Planners for Probabilistic Roadmap Methods, Proceedings of the 1998 IEEE International Conference on Robotics & Automation, May 1998, pp. 630-637, IEEE, Piscataway, United States.

(Continued)

*Primary Examiner* — Xiao M. Wu
*Assistant Examiner* — Aimee Joshua
(74) *Attorney, Agent, or Firm* — Patterson & Sheridan LLP

(57) ABSTRACT

Techniques for associating a graphics object with one of a plurality of target regions of a graphical object template are disclosed. The graphics object is associated with one of the target regions based on the distance between the center of mass of the graphics object and the center of mass of the target region and the overlap amount of the graphics object with the target region. A pre-generated graphics object (stamp object) may also be automatically incorporated into one of the target regions based on the alignment of the minimum bounding box of the stamp object and the minimum bounding box of the target region.

20 Claims, 9 Drawing Sheets

U.S. PATENT DOCUMENTS

| | | | |
|---|---|---|---|
| 2008/0166045 A1* | 7/2008 | Xu et al. | 382/170 |
| 2008/0181453 A1* | 7/2008 | Xu et al. | 382/103 |
| 2009/0232405 A1 | 9/2009 | Taguchi et al. | |
| 2011/0044536 A1* | 2/2011 | Cobb et al. | 382/165 |

OTHER PUBLICATIONS

U.S. Appl. No. 12/871,762, entitled Drawing Figures in Computer-Based Drawing Applications, filed Oct. 30, 2010.

* cited by examiner

Area = 6954
Rotation = 0

Area = 8633
Rotation = -21.5

Area = 4961
Rotation = 16.7

DRAWING FIGURES IN COMPUTER-BASED DRAWING APPLICATIONS

BACKGROUND OF THE INVENTION

1. Field of the Invention

Embodiments of the present invention relate generally to computer graphics and, more specifically, to drawing figures in computer-based drawing applications.

2. Description of the Related Art

Computer-based drawing applications, such as Microsoft Paint and Adobe Photoshop, have been developed to enable users (both children and adults) to draw directly on a digital canvas using various tools, such as a digital pen or digital brushes. In order to help users with limited drawing skills, some drawing applications implement templates that depict different types of real-life objects, such as airplanes, horses, dogs, and the like. When using such a template, a user draws directly over the template regions such that the resulting drawing reflects the basic shape of the depicted object. Some drawing applications may even create animations from the resulting drawing, moving the graphics drawn in the different template regions in a pre-configured manner.

One drawback to using a template in conventional drawing applications is that if the user draws lines outside of the defined target regions, such as the ears, neck, and tail of an animal template, then those lines may not be automatically associated with any of the target regions. As a result, any functionality included in the drawing application based on the association with a target region may be broken. For instance, a user may draw an ear that falls outside of the ear target region. Therefore, when the drawing application generates an animation that moves the ear target region, the user's ear may not move in a corresponding fashion with the ear target region, and the animation may appear incorrect with parts of the animal remaining motionless and disconnected from the rest of the animal.

Another drawback to using a template in conventional drawing applications is that, in certain drawing applications, incorporating pre-generated graphics objects (referred to herein as "stamp objects") into one or more target regions of a template may require a user to resize and orient the graphics objects in order to fit cleanly into the target region. Such a process may be too difficult or frustrating for certain users, especially children.

As the foregoing illustrates, what is needed in the art are improved ways to enable users to draw figures in computer-based drawing applications.

SUMMARY OF THE INVENTION

One embodiment of the invention sets forth a method for associating a graphics object with a first target region of a graphical object template divided into one or more target regions. The method includes the steps of calculating a center of mass of the graphics object, and calculating a center of mass of for at least one target region in the plurality of target regions. The method also includes the steps of, for at least one target region, calculating a distance between the graphics object and the target region, for at least one target region, calculating an overlap amount between the graphics object and the target region, and for at least one target region, calculating a proximity score for the target region based on the distance and the overlap amount. The graphics object is associated with the first target region based on the proximity scores for the different target regions.

Another embodiment of the invention sets forth a method for incorporating a graphics object within a target region of a graphical object template divided into one or more target regions. The method includes the steps of determining a best fit bounding box for the graphics object, where the best fit bounding box has an area and an associated angle of rotation, determining a best fit bounding box for the target region, where the best fit bounding box has an area and an associated angle of rotation, and adjusting the size of the graphics object based on the area of the best fit bounding box for the target region and the orientation of the graphics object based on the angle of rotation of the best fit bounding box for the target region.

One advantage of the disclosed techniques is that a user is not required to draw entirely within a target region of the graphical object template to associate a pen stroke with the target region. Every graphics object drawn or placed in the digital canvas is associated with one of the target regions based on the proximity scores associated with each target region. Therefore, even graphics objects drawn outside of target regions may be animated or manipulated by the application. In addition, another advantage is that a user is not required to manually adjust the orientation and size of a stamp object when trying to incorporate the stamp object into a target region of the graphical object template.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
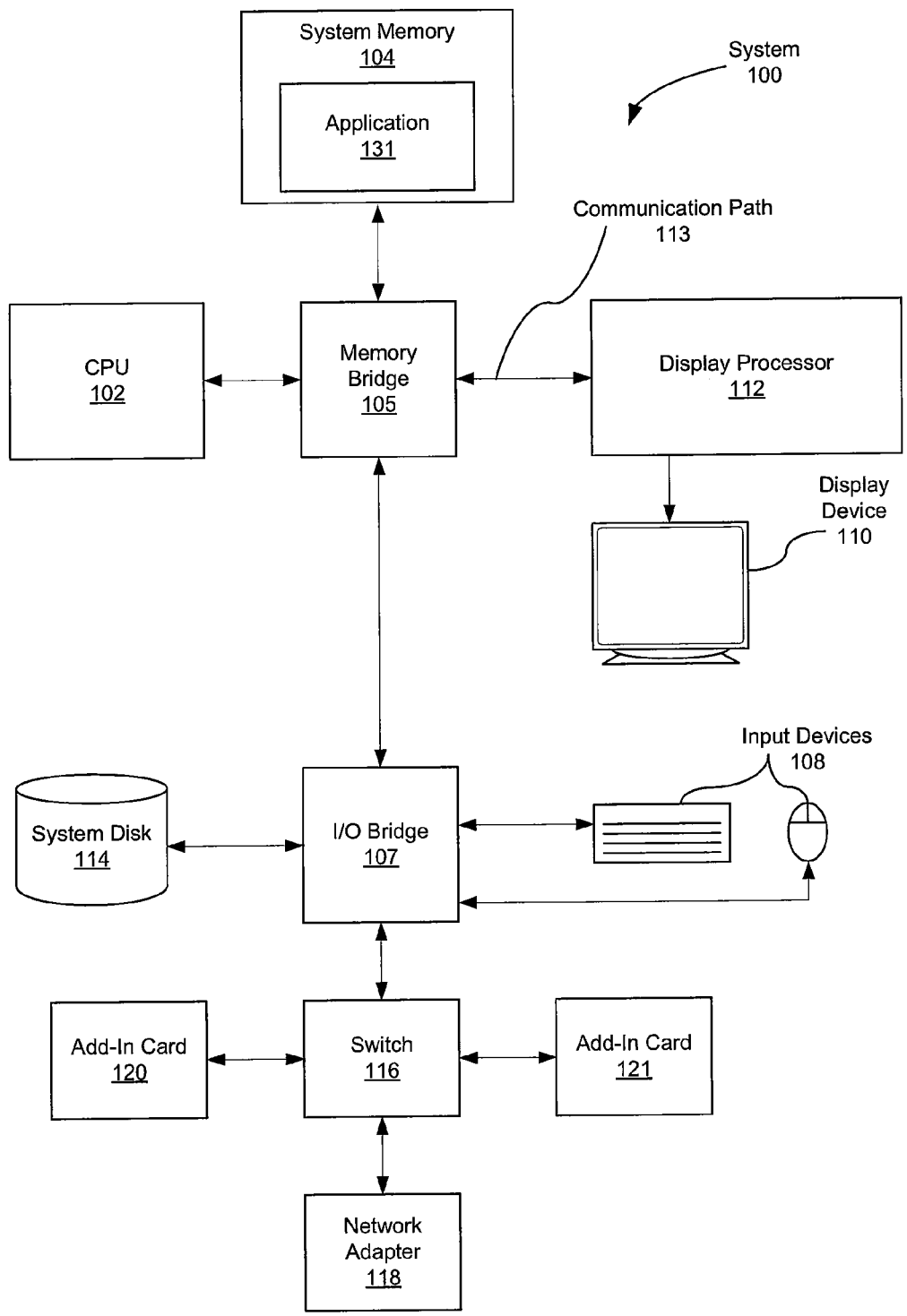
FIG. 1 is a block diagram of a system configured to implement one or more aspects of the invention.

FIG. 1 is a block diagram of a system 100 configured to implement one or more aspects of the present invention. System 100 may be a computer workstation, personal computer, video game console, personal digital assistant, rendering engine, mobile phone, hand held device, smart phone, super-smart phone, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 131 is stored in system memory 104. Application 131 may be any application that when executed on CPU 102 allows users to select and manipulate graphical objects in a document or canvas, such as Adobe Photoshop or GIMP. In alternative embodiments, application 131 may be a Web application, such as a Flash program, that is stored on a remote server and accessed through network adapter 118.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Associating Graphics Objects with Template Target Regions

Figure 2A:
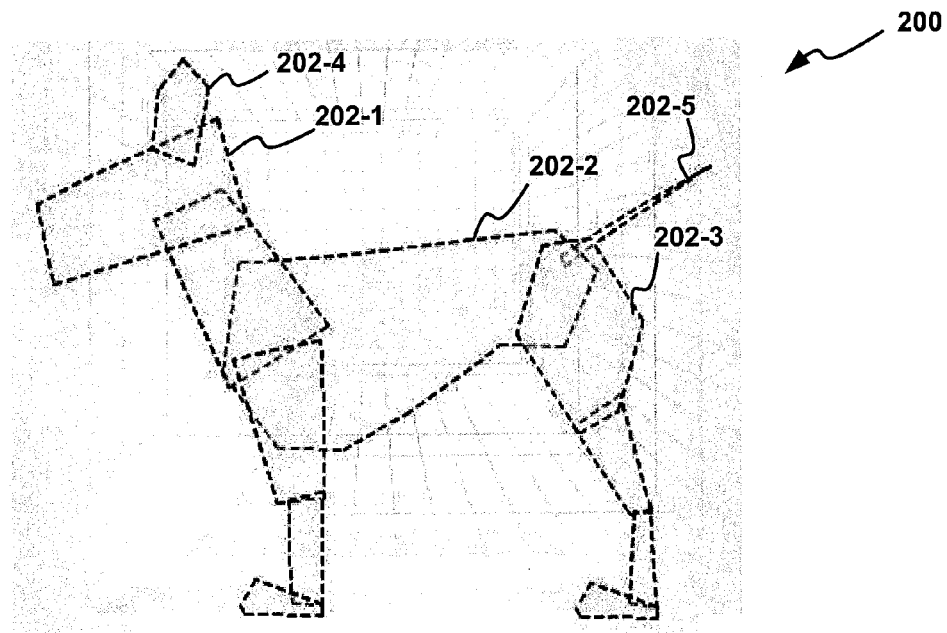
FIG. 2A illustrates an exemplary graphical object template having a plurality of target regions, according to one embodiment of the present invention.

FIG. 2A illustrates an exemplary graphical object template 200 having a plurality of target regions (e.g., 202-1, 202-2, 202-3, 202-4, 202-5, etc.), according to one embodiment of the present invention. As shown, graphical object template 200 illustrates a generic dog, with each of the target regions depicting a different anatomic part of the dog's body (e.g., target region 202-1 depicts the head, target region 202-2 depicts the body, target region 202-3 depicts the thigh, target region 202-4 depicts the ear, target region 202-5 depicts the tail, etc.). The target regions of graphical object template 200 may be positioned freely in graphical object template 200, such as in the case where one target region overlaps another target region or where target regions are non-contiguous. One or more graphical object templates of different animals, people, characters, or other objects may be pre-generated and added to a template library in application 131.

Figure 2B:
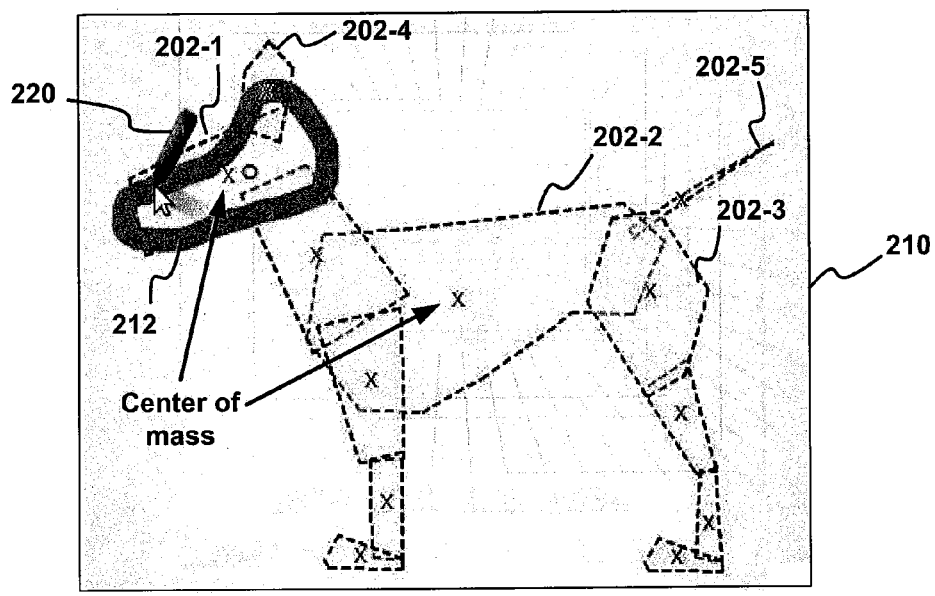
FIG. 2B illustrates an arbitrary hand drawn graphics object on a digital canvas superimposed over the graphical object template of FIG. 2A, according to one embodiment of the present invention.

FIG. 2B illustrates an arbitrary hand drawn graphics object 212 on a digital canvas 210 superimposed over the graphical object template 200 of FIG. 2A, according to one embodiment of the present invention. In one embodiment, digital canvas 210 is included in application 131 and enables a user to draw on the digital canvas 210. Application 131 may superimpose the digital canvas 210 over a specific graphical object template 200 selected from the template library. Application 131 enables a user to draw the graphics object 212 using pen tool 220 anywhere in the digital canvas 210. Application 131 associates graphics object 212 with one of the target regions of the graphical object template 200 based on a proximity score calculated for each target region using factors such as a distance between graphics object 212 and the target region of the graphical object template 200 and an overlap amount of graphics object 212 with the target region of the graphical object template 200. The distance and the overlap amount may be calculated in various ways known in the art without departing from the scope of the present invention. In one embodiment, the distance may be calculated by determining the distance between the center of mass of graphics object 212 and the center of mass of the target region of the graphical object template 200. It will be appreciated that application 131 may use any technically feasible way for calculating a distance between a graphics object and a target region. As shown in FIG. 2B, the letter "x" denotes the center of mass of each target region of graphical object template 200 and the letter "o" denotes the center of mass of graphics object 212.

In one embodiment, application 131 calculates the center of mass of graphics object 212 with reference to fixed X-Y axes with an origin in the lower left of the digital canvas 210. Accordingly, the X-coordinates for each pixel included in graphics object 212 is summed and divided by the total number of pixels included in graphics object 212 to obtain the X-coordinate of the center of mass of graphics object 212. In addition, the Y-coordinates for each pixel included in graphics object 212 is summed and divided by the total number of pixels included in graphics object 212 to obtain the Y-coordinate of the center of mass of graphics object 212. In alternative embodiments, the transparency of the pixels may be factored into the center of mass calculations. For example, if graphics object 212 includes pixel data stored in the RGBA format, the alpha channel may be incorporated as a weight factor for each pixel in the calculations described above.

In one embodiment, the X-coordinates and Y-coordinates of the centers of mass for each target region of graphical object template 200 are calculated in a similar manner as described above for calculating the center of mass of graphics object 212. In alternative embodiments, the center of mass of each target region of graphical object template 200 may be pre-calculated and stored in system memory 104 along with graphical object template 200.

In addition, application 131 calculates the overlap amount of graphics object 212 with each target region of graphical object template 200. In one embodiment, application 131 calculates the overlap amount based on the number of pixels of graphics object 212 that intersect with a particular target region of graphical object template 200. Application 131 may determine the overlap amount using rendering techniques, such as rendering the graphics object 212 and the target region in a frame, using separate colors to render each pixel at 50% transparency, and then searching the pixels of the rendered frame to determine the number of pixels that are a combination of pixel data from both objects. It will be appreciated that the overlap amount may be calculated using any means known in the art without departing from the scope of the present invention, such as by comparing a bounding box of graphics object 212 with a bounding box of the target region of graphical object template 200 to determine a percentage of the bounding box of graphics object 212 that intersects with the bounding box of the target region. In alternative embodiments, the transparency of the pixels may be factored into the overlap amount. For example, if graphics object 212 includes pixel data stored in the RGBA format, the alpha channel may be incorporated as a weight factor for each pixel in the calculations described above.

In one embodiment, graphics object 212 is associated with one of the target regions of graphical object template 200 based on the proximity score for each target region, which can be calculated in a number of ways without departing from the scope of the present invention. For example, as illustrated by Equation (i), the proximity score for a particular target region may be calculated by dividing the sum of a positive integer and the overlap amount of the graphics object 212 with that target region by the sum of the positive integer and the distance between the center of mass of graphics object 212 and the center of mass of that target region.

$$\text{Proximity Score} = \frac{1 + (\text{Overlap Amount})}{1 + (\text{Distance between Centers of Mass})} \quad (i)$$

As shown in Equation (i), the positive integer (1) is added to the variable in the denominator to ensure that the denominator is a non-zero number. Thus, the positive integer is also added to the variable in the numerator to maintain uniformity. A person skilled in the art would realize that since proximity scores are to be used comparatively, any other number other than one that maintains a non-zero denominator in the formula may be used so long as all graphics objects in question are processed using the same formula. Further, a person skilled in the art would realize that other formulas may be used so long as the proximity score is based on some defined relationship between the distance between centers of mass and the overlap amount. It will also be appreciated that application 131 may associate the graphics object 212 with a target region of the graphical object template 200 based on any type of similarity between the graphics object and the target region without departing from the scope of the invention, such as a similarity of the shape of the graphics object with a shape of the target region.

In one embodiment, the target region with the highest proximity score is associated with graphics object 212. As shown below in Table 1, the highest calculated proximity score for graphics object 212 is target region 202-1, which indicates target region 202-1 is associated with graphics object 212 based on the distance between the centers of mass and the overlap amount. It will be readily appreciated that determining the distance and the overlap are independent calculations that may be calculated in any sequence.

TABLE 1

| Region | Overlap Amount | Distance | Score |
| --- | --- | --- | --- |
| Head | 41.7% | 3.5 | 0.3155 |
| Ear | 34.6% | 52.7 | 0.0251 |
| Neck | 12.3% | 70.1 | 0.0158 |
| Front leg top | 0.0% | 146.0 | 0.0068 |
| Body | 0.0% | 155.3 | 0.0064 |
| Front leg bottom | 0.0% | 217.6 | 0.0046 |
| Front foot | 0.0% | 239.9 | 0.0042 |
| Thigh | 0.0% | 256.4 | 0.0039 |
| Tail | 0.0% | 269.7 | 0.0037 |
| Rear leg top | 0.0% | 302.1 | 0.0033 |
| Rear leg bottom | 0.0% | 348.2 | 0.0029 |
| Rear foot | 0.0% | 350.3 | 0.0028 |

In one embodiment, when a user draws graphics object 212 using a freehand drawing tool, such as pen tool 220 or the like, each stroke of the drawing tool generates a new graphics object. For each new graphics object, application 131 calculates the proximity score for each target region of graphical object template 200 after each stroke is complete, and graphics object 212 is associated with a target region. In alternative embodiments, application 131 waits until a particular event occurs, such as saving the drawing or generating an animation, and then calculates the proximity scores for all the graphics objects in digital canvas 210 at once and associates each graphics object with a target region of the graphical object template 200.

In other alternative embodiments, graphics object 212 may be a stamp object stored in system memory 104 along with graphical object template 200. In this case, when a user places the stamp object on the digital canvas 210, the proximity score is calculated for each target region of graphical object template 200. Then, based on the foregoing proximity score calculations, a target region is associated with the stamp object.

As apparent from the above description, graphics object 212 is not required to be drawn or placed completely in the target region in order to be associated with the target region. The proximity calculation formula associates the graphics object with the most appropriate target region in graphical object template 200. Advantageously, in this manner, every graphics object drawn in the digital canvas 212 can be associated with one of the target regions of the graphical object template 200.

Figure 3A:
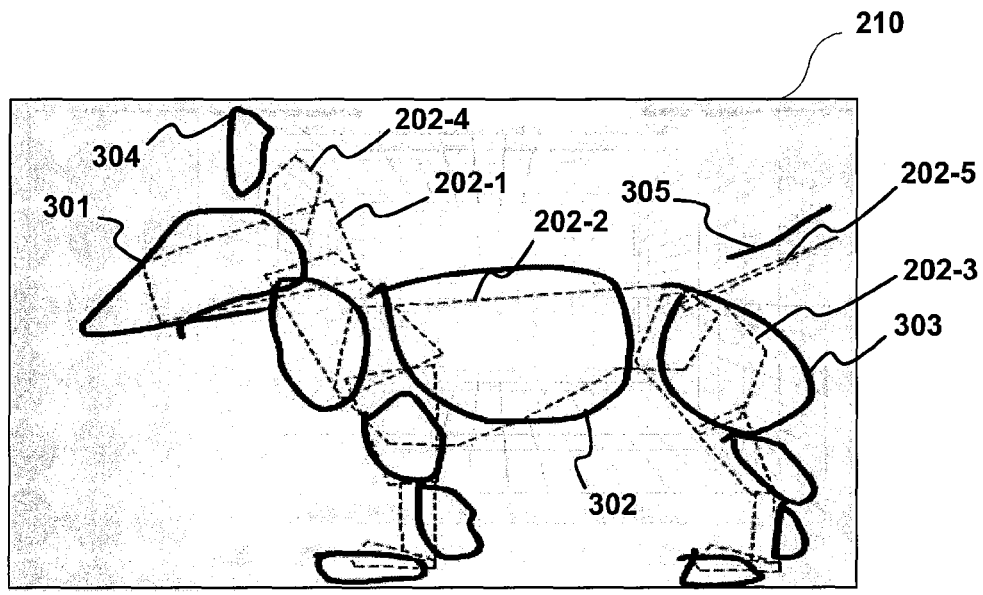
FIGS. 3A-3D illustrate a plurality of graphics objects associated with the graphical object template of FIG. 2A and configured to be animated by an application, according to one embodiment of the present invention.

FIGS. 3A-3D illustrate a plurality of graphics objects associated with the graphical object template 200 of FIG. 2A and configured to be animated by an application 131, according to one embodiment of the present invention. As shown in FIG. 3A, each of the graphics objects included in digital canvas 210 is associated with one of the target regions in graphical object template 200. Graphics object 301 is associated with target region 202-1 (head), graphics object 302 is associated with target region 202-2 (body), graphics object 303 is associated with target region 202-3 (thigh), graphics object 304 is associated with target region 202-4 (ear), and graphics object 305 is associated with target region 202-5 (tail).

Figure 3B:
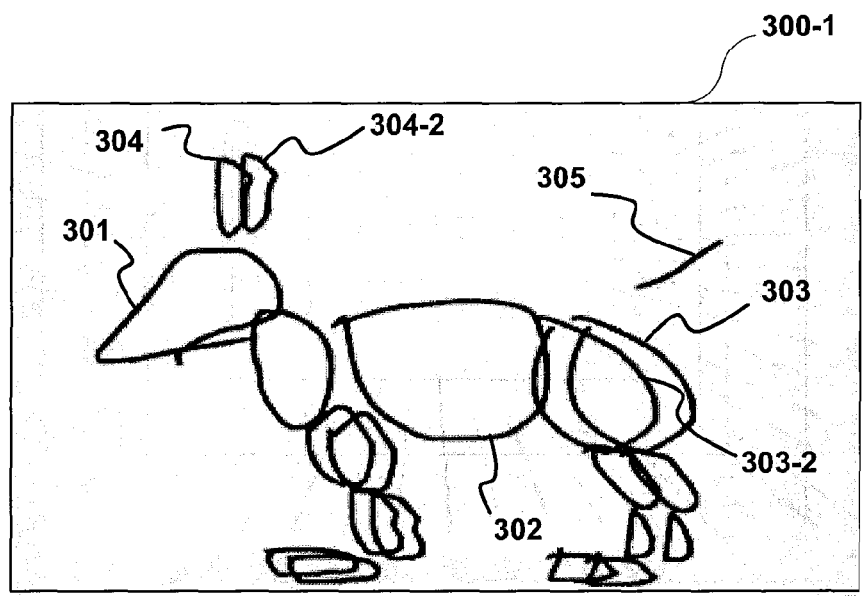

FIG. 3B illustrates a frame 300-1 of an animation generated by application 131 based on the plurality of graphics objects associated with the graphical object template 200 as shown in FIG. 3A. Application 131 may be configured to duplicate graphics objects associated with particular target regions in graphical object template 200. For example, graphical object template 200 depicts a dog, which has two front legs, two rear legs, and two ears. Thus, application 131 may be configured to duplicate any graphics objects associated with target regions 202-3 (thigh) and 202-4 (ear) of graphical object template 200. As shown, graphics object 303 is duplicated to generate graphics object 303-2 and graphics object 304 is duplicated to generate graphics object 304-2.

In one embodiment, in order to generate an animated sequence, application 131 is configured to move the target regions of graphical object template 200 in pre-determined patterns. The graphics objects associated with a particular target region are moved in substantially the same pattern as that target region. For example, graphical object template 200 may be configured to wiggle graphics objects associated with target region 202-4 (ear) and target region 202-5 (tail) when animated by application 131 in response to a user request such as hitting a play button. Thus, when application 131 generates the animation, graphics objects 304 and 304-2 are moved in substantially the same pattern as target region 202-4 and graphics object 305 is moved in substantially the same pattern as target region 202-5.

Figure 3C:
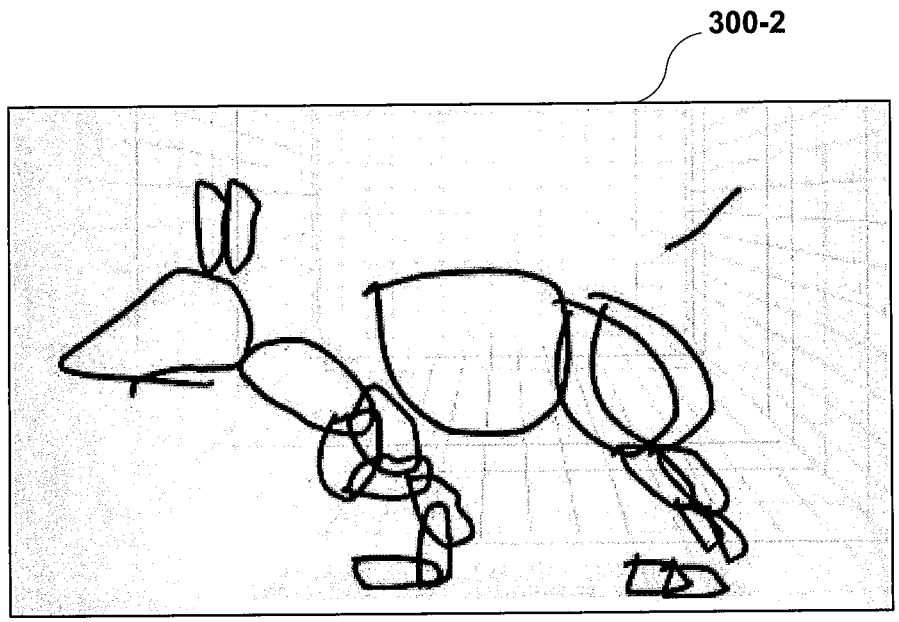
Figure 3D:
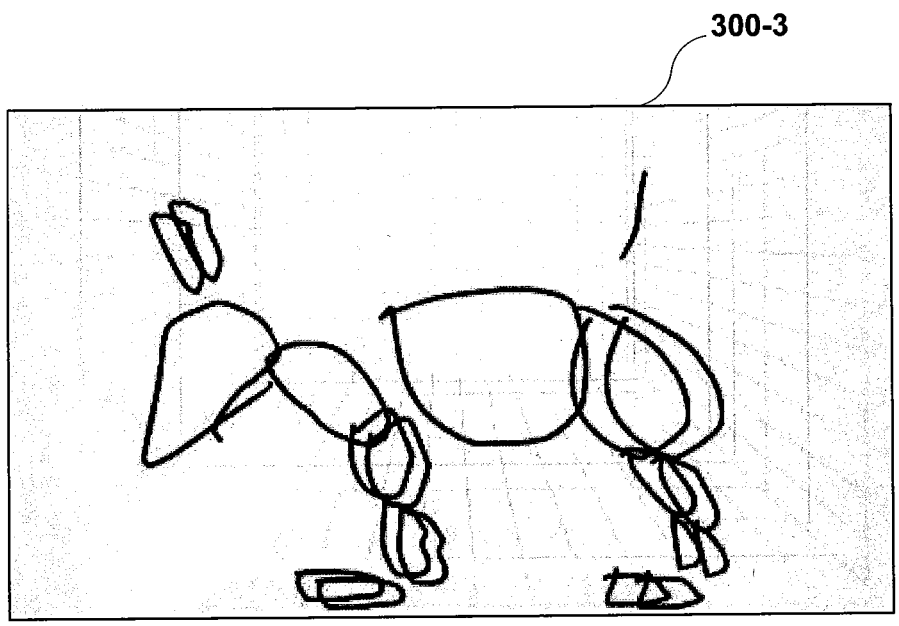

FIGS. 3C-3D illustrate additional frames 300-2 and 300-3 of the animated sequence. In one embodiment, certain target regions of graphical object template 200 may be configured to move in conjunction with other target regions. For instance, the ears may be configured to move in conjunction with the head, the head may be configured to move in conjunction with the neck, etc. In addition, duplicated graphics objects may be configured to move in a different pattern than the parent graphics object used to generate the duplicate, even though both graphics objects are associated with the same target region, as shown by the front legs in FIG. 3C.

Figure 4:
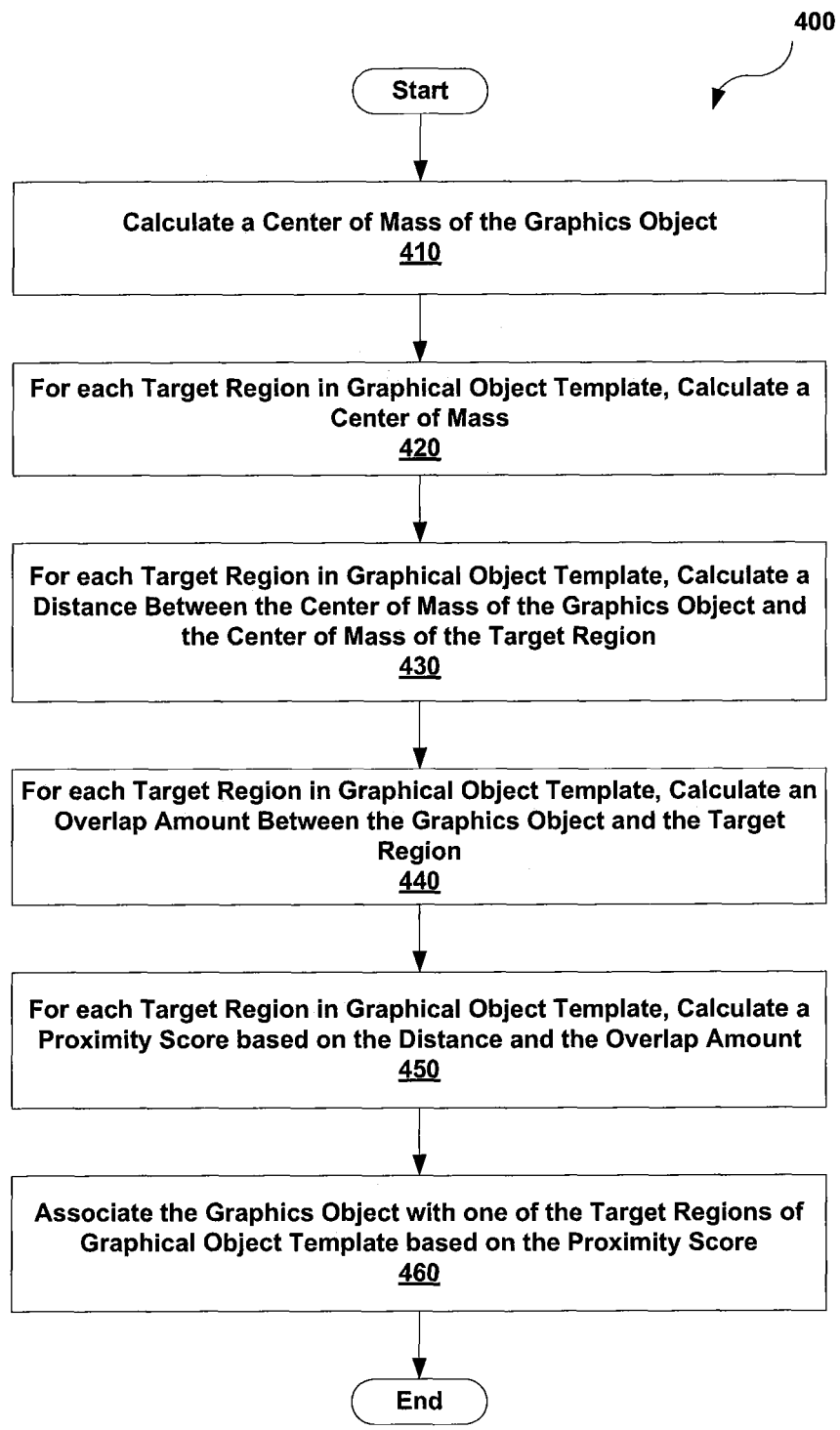
FIG. 4 is a flow diagram of method steps for associating a graphics object with a target region of a graphical object template, according to one embodiment of the present invention.

FIG. 4 is a flow diagram of method steps 400 for associating a graphics object 212 with a target region 202-1 of a graphical object template 200, according to one embodiment of the present invention. Although the method steps are described in conjunction with the systems of FIGS. 1, 2A-2B, and 3A-3D, persons skilled in the art will understand that any system configured to perform the method steps, in any order, is within the scope of the present invention.

As shown, the method begins at step 410, where application 131 calculates a center of mass of graphics object 212. In one embodiment, the X-coordinates for each pixel included in graphics object 212 is summed and divided by the total number of pixels included in graphics object 212 to obtain the X-coordinate of the center of mass of graphics object 212. In addition, the Y-coordinates for each pixel included in graphics object 212 is summed and divided by the total number of pixels included in graphics object 212 to obtain the Y-coordinate of the center of mass of graphics object 212. At step 420, application 131 calculates a center of mass for each target region of the graphical object template 200. The centers of mass for each target region are calculated in a similar fashion to the center of mass of graphics object 212.

At step 430, application 131 calculates the distance between the center of mass of graphics object 212 and each of the target regions of the graphical object template 200. In one embodiment, the distance between the center of mass of graphics object 212 and a particular target region is calculated by taking the square root of the sum of the square of the difference in the X-coordinate of the center of mass of graphics object 212 and the X-coordinate of the center of mass of that target region and the square of the difference in the Y-coordinate of the center of mass of graphics object 212 and the Y-coordinate of the center of mass of that target region. In other alternative embodiments, the distance may be calculated using any other technically feasible approach, such as by using a look-up table.

At step 440, application 131 calculates the overlap amount of graphics object 212 with each target region of graphical object template 200. In one embodiment, application 131 calculates the overlap amount based on the number of pixels of graphics object 212 that intersect with a particular target region of graphical object template 200. In alternative embodiments, the overlap amount may be calculated using any other technically feasible approach, such as by calculating the percentage of a bounding box for graphics object 212 that intersects with a bounding box for the target region.

At step 450, application 131 calculates a proximity score for each target region based on the distance and overlap amount for each target region. In one embodiment, the proximity score is calculated using a formula, as illustrated by Equation (i), shown above. In alternative embodiments, the proximity score may be calculated using any other formula based on the distance and overlap amount. At step 460, application 131 associates graphics object 212 with one of the target regions of graphical object template 200 based on the proximity score. In one embodiment, application 131 may be configured to associate graphics object 204 with the target region that has the highest proximity score.

It will be appreciated that the method described above with reference to a graphics object 212 drawn on the digital canvas 210 may also be used to associate a stamp object placed on the digital canvas 210 with a target region of graphical object template 200.

Incorporating Graphics Objects into Template Target Regions

Figure 5A:
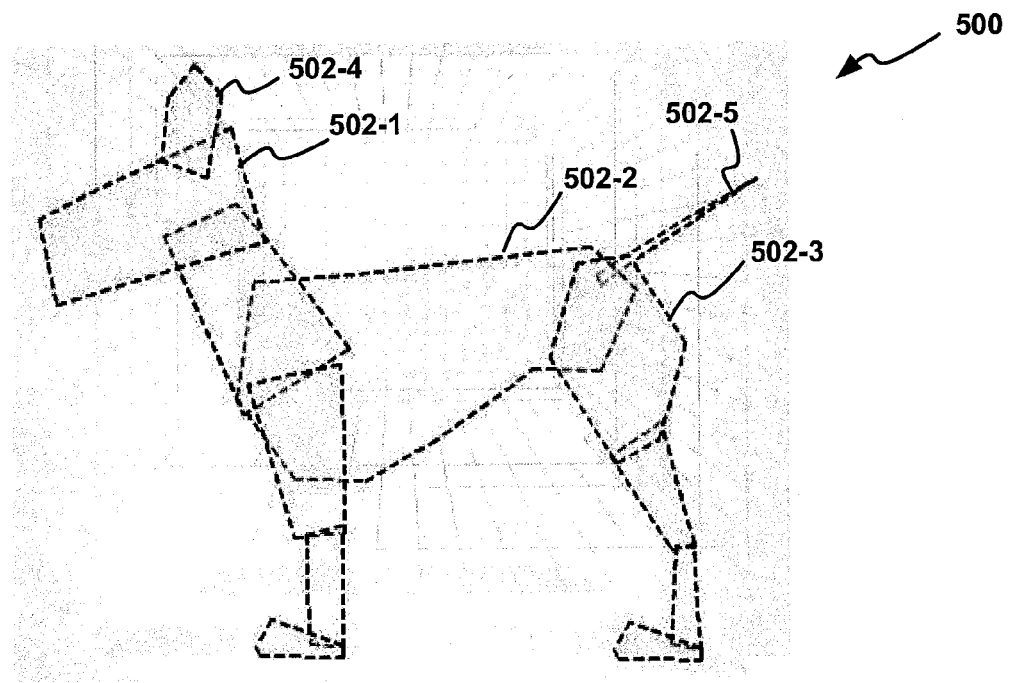
FIG. 5A illustrates an exemplary graphical object template having a plurality of target regions, according to one embodiment of the present invention.

FIG. 5A illustrates an exemplary graphical object template 500 having a plurality of target regions (e.g., 502-1, 502-2, 502-3, 502-4, 502-5, etc.), according to one embodiment of the present invention. Graphical object template 500 is similar to graphical object template 200, as described above with reference to FIG. 2A.

Figure 5B:
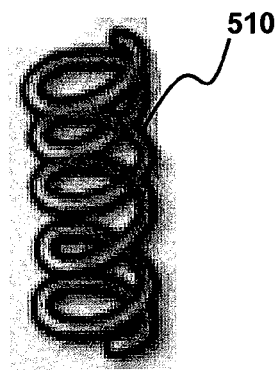
FIG. 5B illustrates a stamp object, according to one embodiment of the present invention.

FIG. 5B illustrates a stamp object 510, according to one embodiment of the present invention. As shown, stamp object 510 is a graphics object depicting a spring that has been pre-generated and stored in system memory 104. In one embodiment, stamp object 510 may be chosen from a library of stamp objects in application 131.

In computer drawing applications, it is often desirable to generate drawings by fitting stamp objects into one or more target regions of a graphical object template, such as graphical object template 500. The foregoing embodiments of the present invention describe how stamp object 510 may be incorporated into one or more target regions of graphical object template 500 in a digital canvas generated within application 131.

Figure 6A:
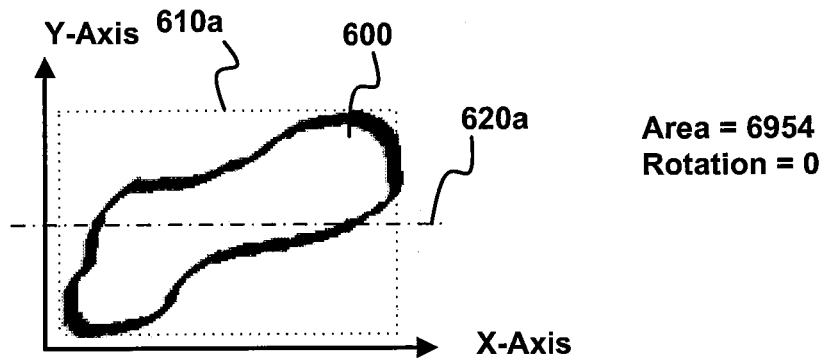
FIGS. 6A-6C illustrate a process for determining the bounding box area and the angle of rotation for the minimum bounding box of any arbitrary graphics object, according to one embodiment of the present invention.
Figure 6B:
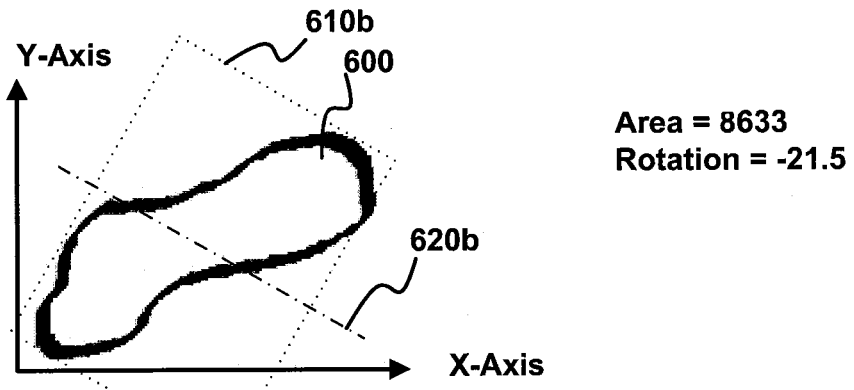
Figure 6C:
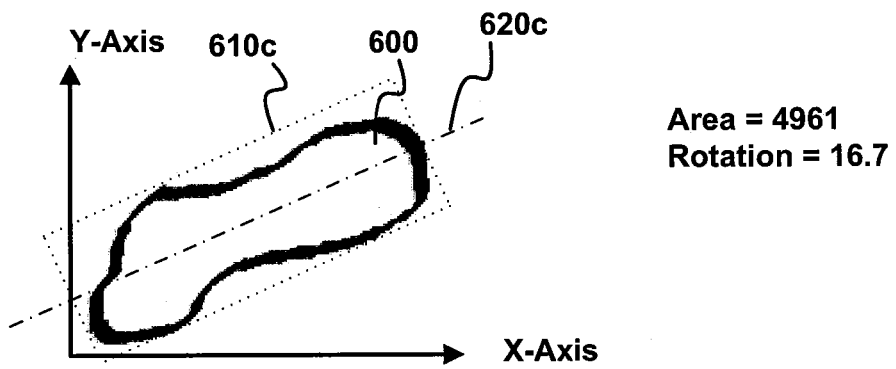

FIGS. 6A-6C illustrate a process for determining the bounding box area and the angle of rotation for the best fit bounding box 610a of any arbitrary graphics object 600, according to one embodiment of the present invention. In one embodiment, the best fit bounding box 610a of the arbitrary graphics object 600 corresponds to the minimum bounding box of arbitrary graphics object 600. It will be appreciated that application 131 may use any technically feasible manner for determining a best fit bounding box for an arbitrary graphics object 600. FIG. 6A shows graphics object 600 as well as a bounding box 610a and a principal axis 620a of bounding box 610a. In the example of FIG. 6A, bounding box 610a has a bounding box area of 6954 pixels. Principal axis 620a is the centerline of bounding box 610a and is oriented at an angle of rotation of 0°. Bounding box 610a has a length dimension parallel to principal axis 620a and a width dimension perpendicular to principal axis 620a. As is also shown, bounding box 610a is aligned lengthwise with graphics object 600 (i.e., bounding box 610a has a greater length dimension than width dimension).

In order to determine the minimum bounding box of graphics object 600, application 131 rotates bounding box 610a around graphics object 600, continuously adjusting bounding box 610a such that bounding box 610a is the smallest rectangle that completely encloses graphics object 600. Application 131 calculates the bounding box area for each orientation of bounding box 610a through an angular displacement of at least 90°, and determines the angle of rotation corresponding to the minimum bounding box area. In one embodiment, application 131 rotates bounding box 610a from −45° to 45°, incrementing the angle of rotation between each calculation of bounding box area by a small incremental angular displacement, such as 0.5°. Application 131 compares the bounding box area for each orientation to determine the minimum bounding box for graphics object 600. Application stores the bounding box area and angle of rotation corresponding to the minimum bounding box for graphics object 600.

FIG. 6B shows graphics object 600 as well as a bounding box 610b and a principal axis 620b of bounding box 610b. In the example of FIG. 6B, bounding box 610b has a bounding box area of 8633 pixels. Principal axis 620b is the centerline of bounding box 610b and is oriented at an angle of rotation of −21.5°. Bounding box 610b is an adjusted version of bounding box 610a such that bounding box 610b is the smallest rectangular geometry that completely encloses graphics object 600 at an orientation of −21.5°. In contrast to the example of FIG. 6A, bounding box 610b is aligned widthwise with graphics object 600 (i.e., bounding box 610b has a greater width dimension than length dimension).

FIG. 6C shows graphics object 600 as well as a bounding box 610c and a principal axis 620c of bounding box 610c. In the example of FIG. 6C, bounding box 610c has a bounding box area of 4961 pixels. Principal axis 620c is the centerline of bounding box 610c and is oriented at an angle of rotation of 16.7°. Bounding box 610c is an adjusted version of bounding box 610a where bounding box 610c is the smallest rectangular geometry that completely encloses graphics object 600 at an orientation of 16.7°. Bounding box 610c corresponds to the minimum bounding box for graphics object 600.

In alternative embodiments, application 131 may rotate graphics object 600 and keep bounding box 610 oriented at 0° with respect to the X-axis. If application 131 rotates graphics object 600 instead of bounding box 610a, then the angle of rotation is based on the orientation of graphics object 600 with respect to the X-axis corresponding to the minimum bounding box of graphics object 600.

Figure 7A:
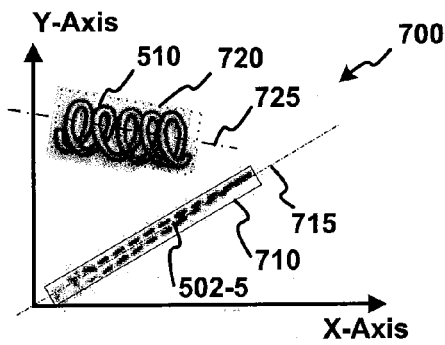
FIGS. 7A-7C illustrate the process of incorporating a stamp object into a target region of the graphical object template of FIG. 5A, according to one embodiment of the present invention.
Figure 7B:
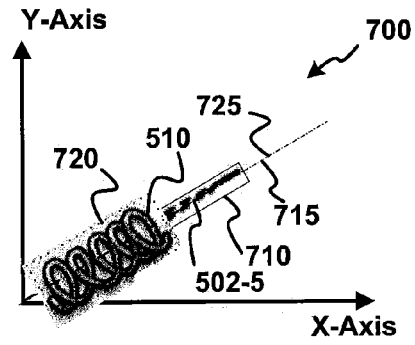
Figure 7C:
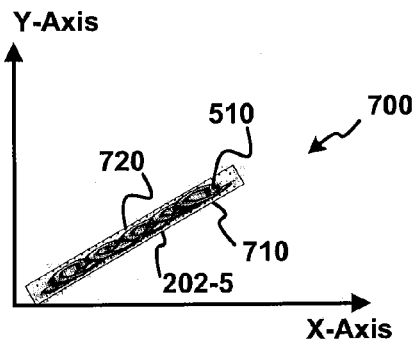

FIGS. 7A-7C illustrate the process of incorporating a stamp object 510 into a target region 502-5 of the graphical object template 500 of FIG. 5A, according to one embodiment of the present invention. FIG. 7A shows stamp object 510 in a digital canvas 700 superimposed over target region 502-5 of the graphical object template 500. Application 131 may be configured to incorporate stamp object 510 into a target region of graphical object template 500 when stamp object 510 is placed in digital canvas 700. As previously described herein, bounding box 720 is the bounding box having the minimum area that is able to encapsulate stamp object 510. Principal axis 725 is the centerline of bounding box 720. Similarly, bounding box 710 is the bounding box having the minimum area that is able to encapsulate target region 502-5. Principal axis 715 is the centerline of bounding box 710.

In one embodiment, application 131 ensures that bounding box 720 is aligned lengthwise with stamp object 510 and that bounding box 710 is aligned lengthwise with target region 502-5. If bounding box 720 is aligned widthwise with stamp object 510, then application 131 rotates bounding box 720 by 90° such that bounding box 720 still corresponds to a minimum bounding box of stamp object 510, but bounding box 720 is aligned lengthwise with stamp object 510. Similarly, if bounding box 710 is aligned widthwise with target region 502-5, then application 131 rotates bounding box 710 by 90° such that bounding box 710 still corresponds to a minimum bounding box of target region 502-5, but bounding box 710 is aligned lengthwise with target region 502-5. In this manner, application 131 ensures that the longer dimension of stamp object 510 is aligned with the longer dimension of tail 502-5 target region.

FIG. 7B shows stamp object 510 aligned with target region 502-5. In one embodiment, application 131 aligns principal axis 725 with principal axis 715 by rotating and placing stamp object 510 over target region 502-5 such that principal axis 725 is co-linear with principal axis 715. FIG. 7C shows stamp object 510 scaled such that the bounding box area of bounding box 720 is equal to the bounding box area of bounding box 710. Once the bounding boxes are aligned, stamp object 510 is scaled such that the length dimension of bounding box 720 is equal to the length dimension of bounding box 710 and the width dimension of bounding box 720 is equal to the width dimension of bounding box 710. Through this process, stamp object 510 is oriented and sized to fit within target region 502-5 of the graphical object template 500. It will be appreciated that application 131 may adjust the size of stamp object 510 by any type of scaling without departing from the scope of the invention, such as scaling the length and width of stamp object 510 using a uniform scale factor or scaling the length and width of stamp object 510 independently.

In alternative embodiments, application 131 may be configured to limit the skew of stamp object 510 created by disproportionate scaling of the length and width dimensions of stamp object 510. For example, application 131 could limit the ratio of the scaling factors used to scale the length and width dimensions of stamp object 510 to some pre-determined minimum aspect ratio.

Figure 8:
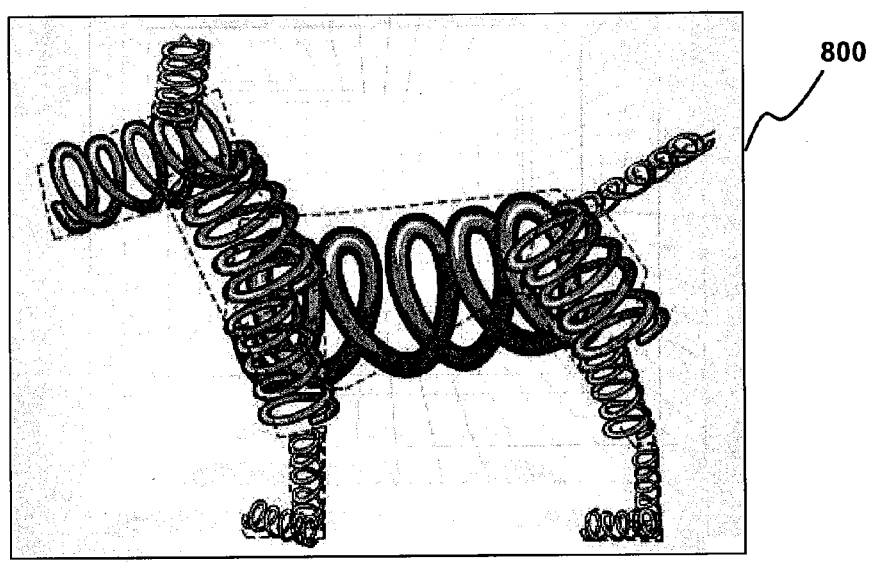
FIG. 8 illustrates a digital canvas in an application in which a stamp object is fit to all of the target regions of the graphical object template of FIG. 5A, according to one embodiment of the present invention.

FIG. 8 illustrates a digital canvas 800 in an application in which a stamp object 510 is oriented and sized to fit within each of the target regions of the graphical object template 500 of FIG. 5A, according to one embodiment of the present invention. Each instance of stamp object 510 is aligned lengthwise with the target region associated with that instance of stamp object 510. In one embodiment, a user may choose different graphics objects to incorporate into each target region of the plurality of target regions of graphical object template 500. In another embodiment, the user may choose a single graphics object that is then copied and incorporated into each of the target regions automatically. It will be appreciated that incorporating the graphics object 510 into a target region of a graphical object template 500 is an automatic process that, advantageously, does not require a user to manually adjust the orientation or the size of the graphics object 510.

Figure 9:
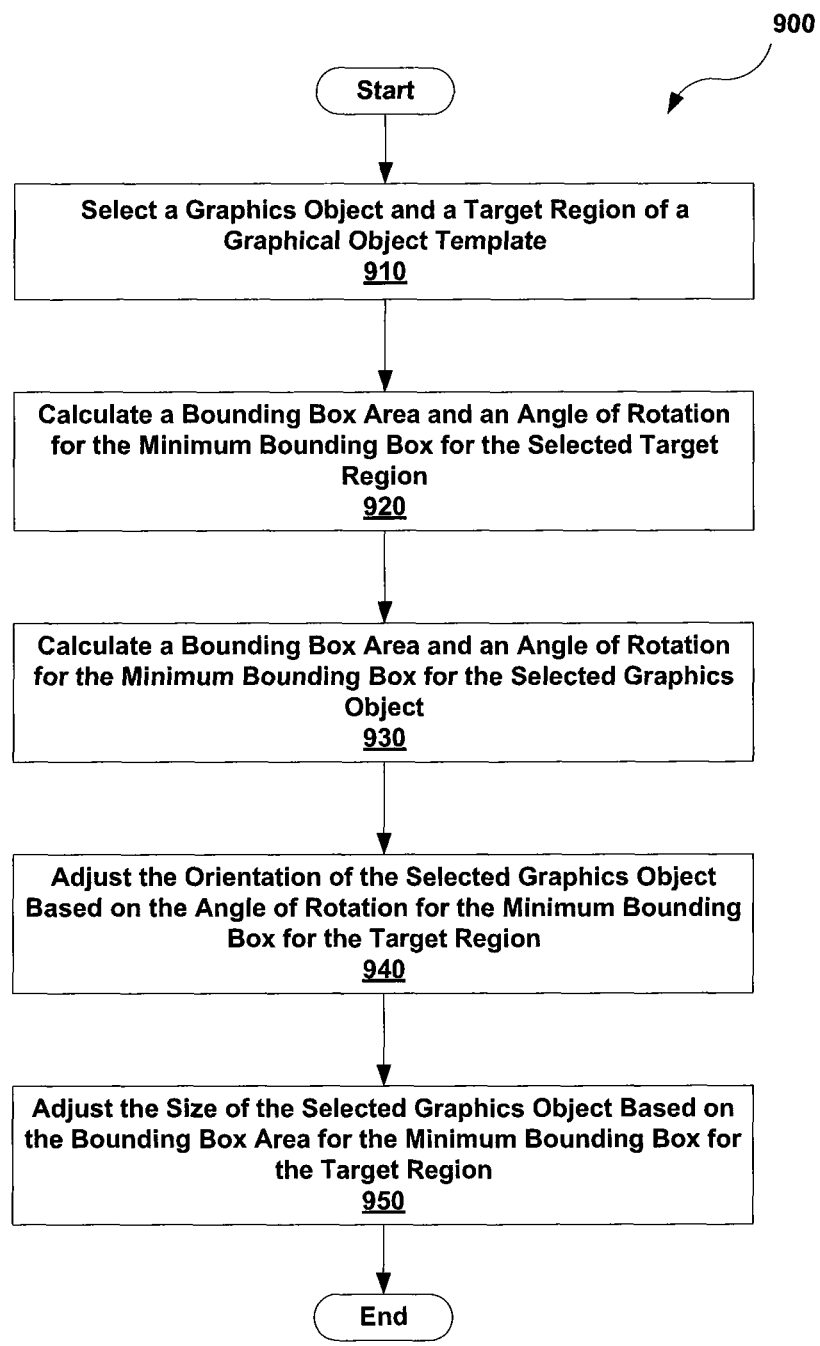
FIG. 9 is a flow diagram of method steps for incorporating a stamp object into one or more target regions in graphical object template, according to one embodiment of the present invention.

FIG. 9 is a flow diagram of method steps 900 for incorporating a stamp object 510 into one or more target regions in graphical object template 500, according to one embodiment of the present invention. Although the method steps are described in conjunction with the systems of FIGS. 5A-5B, 6A-6C, 7A-7C, and 8, persons skilled in the art will understand that any system configured to perform the method steps, in any order, is within the scope of the present invention.

At step 910, application 131 selects a graphics object and a target region of a graphical object template 500. In one embodiment, where the user has placed a stamp object 510 in the digital canvas 700, application 131 selects the stamp object 510 and the target region of graphical object template 500 with the highest proximity score corresponding to the placement of stamp object 510 in the digital canvas 700. For example, as shown in FIG. 7A, stamp object 510 is placed in the digital canvas 700 such that target region 502-5 has the highest proximity score. Therefore, application 131 selects target region 502-5 and stamp object 510.

At step 920, application 131 determines a bounding box area and an angle of rotation corresponding to the minimum bounding box 710 of target region 502-5. In one embodiment, application 131 determines the bounding box area and angle of rotation corresponding to the minimum bounding box 710 of target region 502-5 using the process as described above with reference to FIGS. 6A-6C. In other alternative embodiments, the bounding box area and angle of rotation corresponding to the minimum bounding box of each target region of graphical object template 500 are pre-calculated by any process known in the art and stored along with graphical object template 500. In the case where the bounding box area and angle of rotation corresponding to the minimum bounding box of each target region are stored with graphical object template 500, application 131 may retrieve the bounding box area and angle of rotation stored with graphical object template 500 for target region 502-5.

Similarly, at step 930, application 131 determines a bounding box area and an angle of rotation corresponding to the minimum bounding box 720 of stamp object 510. In one embodiment, application 131 determines the bounding box area and angle of rotation corresponding to the minimum bounding box of stamp object 510 using the process as described above with reference to FIGS. 6A-6C. In other alternative embodiments, the bounding box area and angle of rotation corresponding to the minimum bounding box of stamp object 510 are pre-calculated by any process known in the art and stored with stamp object 510. In the case where the bounding box area and angle of rotation corresponding to the minimum bounding box of stamp object 510 are stored with stamp object 510, application 131 may retrieve the bounding box area and angle of rotation stored with stamp object 510.

At step 940, application 131 adjusts the orientation of stamp object 510 based on the angle of rotation for the minimum bounding box 710 of target region 502-5. In one embodiment, application 131 aligns the principal axis 725 of the minimum bounding box 720 of stamp object 510 with the principal axis 715 of the minimum bounding box 710 of target region 502-5 such that the principal axis 725 of the minimum bounding box 725 of stamp object 510 is co-linear with the principal axis 715 of the minimum bounding box 710 of target region 502-5. Application 131 first rotates stamp object 510 such that the principal axis 725 of the minimum bounding box 720 of stamp object 510 is parallel to the principal axis 715 of the minimum bounding box 710 of target region 502-5, and then places stamp object 510 over the target region 502-5 such that the principal axis 725 of the minimum bounding box 720 of stamp object 510 is co-linear with the principal axis 715 of the minimum bounding box 710 of target region 502-5.

At step 950, application 131 adjusts the size of stamp object 510 by an amount such that the bounding box area of the minimum bounding box 720 of stamp object 510 is equal to the bounding box area of the minimum bounding box 710 of target region 502-5. Stamp object 510 is scaled such that the length dimension of the minimum bounding box 720 of scaled stamp object 510 is equal to the length dimension of the minimum bounding box 710 of target region 502-5, and the width dimension of the minimum bounding box 720 of scaled stamp object 510 is equal to the width dimension of the minimum bounding box 710 of target region 502-5. It will be appreciated that the rotation, placement, and scaling manipulations performed by application 131 on stamp object 510 may be performed in any sequence using any feasible technique well-known in the art.

In sum, the approach described above enables a user to draw graphics objects or place stamp objects on a digital canvas in a drawing application that is superimposed over a graphical object template. When the user draws a graphics object or places a stamp object on the digital canvas, the application associates the graphics object with a target region in the graphical object template. The graphics object or stamp object is associated with the most appropriate target region in the graphical object template using a formula based on the distance between the center of mass of the graphics object and the center of mass of the target region and the overlap amount of the graphics object with the target region. In addition, the application may also be configured to enable the user to place a stamp object on the digital canvas, and for the application to automatically adjust the orientation and the size of the stamp object in order to incorporate the stamp object into a target region.

One advantage of the disclosed techniques is that a user is not required to draw entirely within a target region of the graphical object template to associate a pen stroke with the target region. Every graphics object drawn or placed in the digital canvas is associated with one of the target regions based on the proximity scores associated with each target region. Therefore, even graphics objects drawn outside of target regions may be animated or manipulated by the application. In addition, another advantage is that a user is not required to manually adjust the orientation and size of a stamp object when trying to incorporate the stamp object into a target region of the graphical object template.

Another advantage of the disclosed techniques is that they place no constraints on the positioning of the target regions within the graphical object template, as long as the graphical object template uses the same coordinate space as the digital canvas. For example, target regions may or may not overlap and may or may not be contiguous. Yet another advantage of the disclosed techniques is that they place no constraints on the geometry of graphics objects, stamp objects, and target regions. This is because various methods of calculating center of mass, overlap, and bounding boxes are well-known in the art and can be calculated for any arbitrary graphics object displayed on the screen. Allowable geometries include but are not limited to closed regions, lines, curves, or a collection of many shapes, contiguous or noncontiguous.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for incorporating a graphics object within a target region of a graphical object template divided into one or more target regions, the method comprising:

determining a best fit bounding box from a plurality of bounding boxes for the graphics object, wherein the best fit bounding box has an area and an associated angle of rotation, wherein the area of the best fit bounding box for the graphics object is not greater than a respective area of the remaining plurality of bounding boxes for the graphics object;

determining a best fit bounding box from a plurality of bounding boxes for the target region, wherein the best fit bounding box has an area and an associated angle of rotation, wherein the area of the best fit bounding box of the target region is not greater than a respective area of the remaining plurality of bounding boxes for the target region, wherein the plurality of bounding boxes for the graphics object and the target region have a range of angles traversing at least 90 degrees; and adjusting the size of the graphics object based on the area of the best fit bounding box for the target region and the orientation of the graphics object based on the angle of rotation of the best fit bounding box for the target region.

2. The method of claim 1, wherein the graphics object is different than the target region, wherein the best fit bounding box for the graphics object corresponds to a minimum bounding box for the graphics object, and wherein the best fit bounding box for the target region corresponds to a minimum bounding box for the target region.

3. The method of claim 1, wherein determining the best fit bounding box for the graphics object comprises:
   for each angle of a plurality of angles traversing at least 90 degrees, calculating an area of a bounding box generated around the graphics object;
   identifying the bounding box having the smallest area as the best fit bounding box for the graphics object; and
   defining the angle in the plurality of angles associated with the best fit bounding box as the associated angle of rotation,
and, wherein determining the best fit bounding box for the target region comprises:
   for each angle of a plurality of angles traversing at least 90 degrees, calculating an area of a bounding box generated around the target region;
   identifying the bounding box having the smallest area as the best fit bounding box for the target region; and
   defining the angle in the plurality of angles associated with the best fit bounding box as the associated angle of rotation.

4. The method of claim 1, wherein adjusting the orientation of the graphics object comprises aligning a principal axis of the best fit bounding box for the graphics object with a principal axis of the best fit bounding box for the target region.

5. The method of claim 4, wherein adjusting the orientation of the graphics object further comprises:
   rotating the graphics object by an angle of rotation equal to the difference between the angle of rotation of the best fit bounding box for the graphics object and the angle of rotation of the best fit bounding box for the target region; and
   moving the graphics object until a principal axis of the best fit bounding box for the graphics object is collinear with a principal axis of the best fit bounding box for the target region.

6. The method of claim 1, wherein adjusting the size of the graphics object comprises scaling the graphics object until the dimensions of the best fit bounding box for the graphics object are substantially equal to the dimensions of the best fit bounding box for the target region.

7. The method of claim 1, wherein for each target regions in the one or more target regions, the area of the best fit bounding box for the target region and the angle of rotation of the best fit bounding box for the target region are pre-calculated and stored in memory along with the graphical object template.

8. The method of claim 1, wherein, for at least one other target region in the plurality of target regions, the steps of determining a best fit bounding box for the target region and adjusting the size and orientation of the graphics object are performed, wherein a different instance of the graphics object is incorporated within each target region in the one or more target regions.

9. A non-transitory computer readable storage medium, storing instructions that when executed by a processor, cause the processor to incorporate a graphics object within a target region of a graphical object template divided into one or more target regions, by performing the steps of:
   determining a best fit bounding box from a plurality of bounding boxes for the graphics object, wherein the best fit bounding box has an area and an associated angle of rotation, wherein the area of the best fit bounding box for the graphics object is not greater than a respective area of the remaining plurality of bounding boxes for the graphics object;
   determining a best fit bounding box from a plurality of bounding boxes for the target region, wherein the best fit bounding box has an area and an associated angle of rotation, wherein the area of the best fit bounding box of the target region is not greater than a respective area of the remaining plurality of bounding boxes for the target region, wherein the plurality of bounding boxes for the graphics object and the target region have a range of angles traversing at least 90 degrees; and
   adjusting the size of the graphics object based on the area of the best fit bounding box for the target region and the orientation of the graphics object based on the angle of rotation of the best fit bounding box for the target region.

10. The computer readable storage medium of claim 9, wherein the graphics object is different than the target region, wherein the best fit bounding box for the graphics object corresponds to a minimum bounding box for the graphics object, and wherein the best fit bounding box for the target region corresponds to a minimum bounding box for the target region.

11. The computer readable storage medium of claim 9, wherein determining the best fit bounding box for the graphics object comprises:
   for each angle of a plurality of angles traversing at least 90 degrees, calculating an area of a bounding box generated around the graphics object;
   identifying the bounding box having the smallest area as the best fit bounding box for the graphics object; and
   defining the angle in the plurality of angles associated with the best fit bounding box as the associated angle of rotation,
and, wherein determining the best fit bounding box for the target region comprises:
   for each angle of a plurality of angles traversing at least 90 degrees, calculating an area of a bounding box generated around the target region;
   identifying the bounding box having the smallest area as the best fit bounding box for the target region; and
   defining the angle in the plurality of angles associated with the best fit bounding box as the associated angle of rotation.

12. The computer readable storage medium of claim 9, wherein adjusting the orientation of the graphics object comprises aligning a principal axis of the best fit bounding box for the graphics object with a principal axis of the best fit bounding box for the target region.

13. The computer readable storage medium of claim 12, wherein adjusting the orientation of the graphics object further comprises:
   rotating the graphics object by an angle of rotation equal to the difference between the angle of rotation of the best fit bounding box for the graphics object and the angle of rotation of the best fit bounding box for the target region; and
   moving the graphics object until a principal axis of the best fit bounding box for the graphics object is collinear with a principal axis of the best fit bounding box for the target region.

14. The computer readable storage medium of claim 9, wherein adjusting the size of the graphics object comprises scaling the graphics object until the dimensions of the best fit bounding box for the graphics object are substantially equal to the dimensions of the best fit bounding box for the target region.

15. The computer readable storage medium of claim 9, wherein for at least one target region in the one or more target regions, the area of the best fit bounding box for the target region and the angle of rotation of the best fit bounding box for the target region are pre-calculated and stored in memory along with the graphical object template.

16. The computer readable storage medium of claim 9, wherein, for at least one of the other target regions in the one or more target regions, the steps of determining a best fit bounding box for the target region and adjusting the size and orientation of the graphics object are performed.

17. The computer readable storage medium as recited in claim 16, wherein a different instance of the graphics object is incorporated within each target region in the one or more target regions.

18. A system for incorporating a graphics object within a target region of a graphical object template divided into one or more target regions, the system comprising:
a processor configured to:
determine a best fit bounding box from a plurality of bounding boxes for the graphics object, wherein the best fit bounding box has an area and an associated angle of rotation, wherein the area of the best fit bounding box for the graphics object is not greater than a respective area of the remaining plurality of bounding boxes for the graphics object,
determine a best fit bounding box from a plurality of bounding boxes for the target region, wherein the best fit bounding box has an area and an associated angle of rotation, wherein the area of the best fit bounding box of the target region is not greater than a respective area of the remaining plurality of bounding boxes for the target region, wherein the plurality of bounding boxes for the graphics object and the target region have a range of angles traversing at least 90 degrees, and
adjust the size of the graphics object based on the area of the best fit bounding box for the target region and the orientation of the graphics object based on the angle of rotation of the best fit bounding box for the target region.

19. The system of claim 18, wherein the graphics object is different than the target region, further comprising a memory that includes instructions that when executed by the processor cause the processor to:
determine the best fit bounding box for the target region, comprising:
for each angle of a plurality of angles traversing at least 90 degrees, calculating an area of a bounding box generated around the graphics object;
identifying the bounding box having the smallest area as the best fit bounding box for the graphics object; and
defining the angle in the plurality of angles associated with the best fit bounding box as the associated angle of rotation; and
determine the best fit bounding box for the target region, comprising:
for each angle of a plurality of angles traversing at least 90 degrees, calculating an area of a bounding box generated around the target region;
identifying the bounding box having the smallest area as the best fit bounding box for the target region; and
defining the angle in the plurality of angles associated with the best fit bounding box as the associated angle of rotation.

20. A non-transitory computer readable storage medium, storing instructions that when executed by a processor, cause the processor to incorporate a graphics object within a target region of a graphical object template divided into one or more target regions, by performing the steps of:
determining a best fit bounding box for the graphics object, wherein the best fit bounding box has an area and an associated angle of rotation;
determining a best fit bounding box for the target region, wherein the best fit bounding box has an area and an associated angle of rotation, wherein for at least one target region in the one or more target regions, the area of the best fit bounding box for the target region and the angle of rotation of the best fit bounding box for the target region are pre-calculated; and stored in memory along with the graphical object template; and
adjusting the size of the graphics object based on the area of the best fit bounding box for the target region and the orientation of the graphics object based on the angle of rotation of the best fit bounding box for the target region.

* * * * *